(12) United States Patent
Kominami et al.

(10) Patent No.: US 12,129,031 B2
(45) Date of Patent: Oct. 29, 2024

(54) DISCHARGE SYSTEM FOR AIRCRAFT

(71) Applicant: TOYO SEIKAN CO., LTD., Tokyo (JP)

(72) Inventors: Atsushi Kominami, Kanagawa (JP); Soji Araki, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 336 days.

(21) Appl. No.: 17/437,109

(22) PCT Filed: Feb. 25, 2020

(86) PCT No.: PCT/JP2020/007397
§ 371 (c)(1),
(2) Date: Sep. 8, 2021

(87) PCT Pub. No.: WO2020/184164
PCT Pub. Date: Sep. 17, 2020

(65) Prior Publication Data
US 2022/0177132 A1 Jun. 9, 2022

(30) Foreign Application Priority Data
Mar. 8, 2019 (JP) .................. 2019-043206

(51) Int. Cl.
*B64D 1/18* (2006.01)
*B64U 10/13* (2023.01)
(Continued)

(52) U.S. Cl.
CPC ............ *B64D 1/18* (2013.01); *B64U 10/13* (2023.01); *B64U 20/70* (2023.01); *B65D 83/384* (2013.01);
(Continued)

(58) Field of Classification Search
CPC ........ B64D 1/18; B64D 47/08; B65D 83/384; B65D 83/26; B65D 83/262; B65D 83/386;
(Continued)

(56) References Cited

U.S. PATENT DOCUMENTS 7,785,541 B1 *  8/2010  Fiorello ................. B05B 12/00
                                                 422/123
2016/0082460 A1 *  3/2016  McMaster ............ B05B 9/0403
                                                 239/722
(Continued)

FOREIGN PATENT DOCUMENTS

CN      105818985 A      8/2016
CN      105905302 A      8/2016
(Continued)

OTHER PUBLICATIONS

Office Action in CN Application No. 202080019390.0 dated May 11, 2023, 15 pages.
(Continued)

*Primary Examiner* — Bob Zadeh
(74) *Attorney, Agent, or Firm* — MARSHALL, GERSTEIN & BORUN LLP

(57) ABSTRACT

The present invention provides a discharge system for an aircraft, in which a remaining amount of an aerosol container can be displayed so that an exchange timing can be managed systematically. A discharge device for an aircraft, having an aerosol container and a discharge device for discharging contents from the aerosol container, wherein the discharge system discharges the contents of the aerosol container while the aerosol container is attached to the aircraft, includes remaining amount acquiring means for acquiring information indicating a remaining amount of the contents of the aerosol container, and display means for displaying the remaining amount in accordance with the
(Continued)

remaining amount information acquired by the remaining amount acquiring means.

13 Claims, 8 Drawing Sheets

(51) Int. Cl.
*B64U 20/70* (2023.01)
*B65D 83/38* (2006.01)
*B64U 101/30* (2023.01)
*B64U 101/47* (2023.01)
*B65D 83/26* (2006.01)

(52) U.S. Cl.
CPC ...... *B64U 2101/30* (2023.01); *B64U 2101/47* (2023.01); *B65D 83/26* (2013.01)

(58) Field of Classification Search
CPC .. B64C 39/024; B64U 10/13; B64U 2101/00; B05B 13/005
See application file for complete search history.

(56) References Cited

U.S. PATENT DOCUMENTS

| | | | |
|---|---|---|---|
| 2016/0214715 A1* | 7/2016 | Meffert | G01S 17/88 |
| 2017/0129605 A1* | 5/2017 | Wu | B05B 12/02 |
| 2017/0200530 A1* | 7/2017 | Davis | B05C 5/00 |
| 2022/0177132 A1* | 6/2022 | Kominami | B65D 83/384 |

FOREIGN PATENT DOCUMENTS

| | | | | |
|---|---|---|---|---|
| CN | 207502965 U | | 6/2018 | |
| CN | 108427329 A | | 8/2018 | |
| CN | 109032213 | * | 12/2018 | |
| CN | 109032213 A | | 12/2018 | |
| CN | 109122633 | * | 1/2019 | |
| CN | 109122633 A | | 1/2019 | |
| DE | 102012022925 A1 | * | 5/2014 | .......... B64C 39/024 |
| JP | 2012-166114 A | | 9/2012 | |
| JP | 2017-104063 A | | 6/2017 | |
| JP | 2017104063 | * | 6/2017 | |
| WO | WO-2017/094842 A1 | | 6/2017 | |
| WO | WO 20170948420 | * | 6/2017 | |

OTHER PUBLICATIONS

Office Action in JP Application No. 2019-043206 dated Mar. 3, 2020, 9 pages.
Search Report in International Application No. PCT/JP2020/007397 dated Apr. 28, 2020, 4 pages.
Extended European Search Report in EP Application No. 20770502.1 dated Sep. 30, 2022, 11 pages.

* cited by examiner

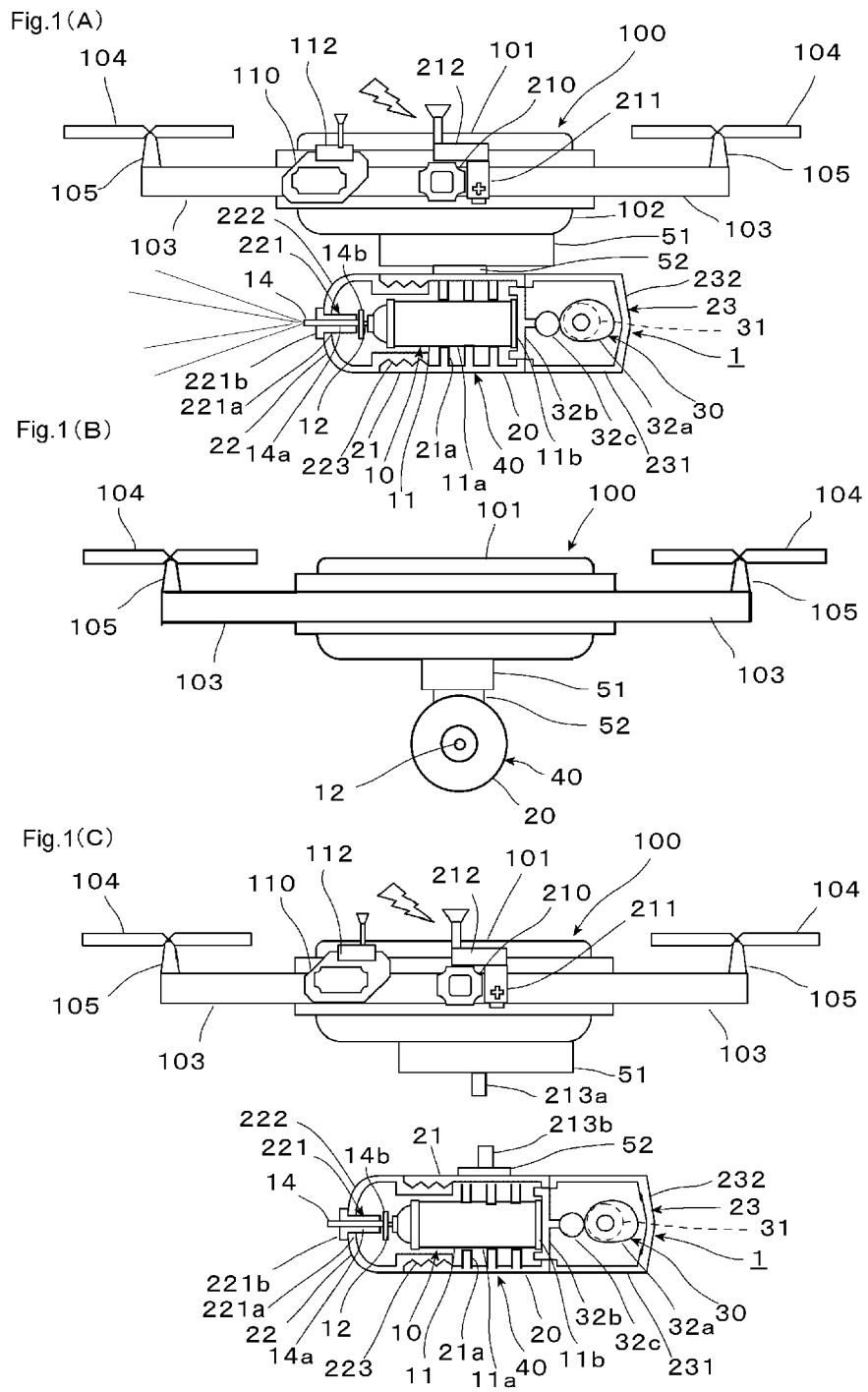

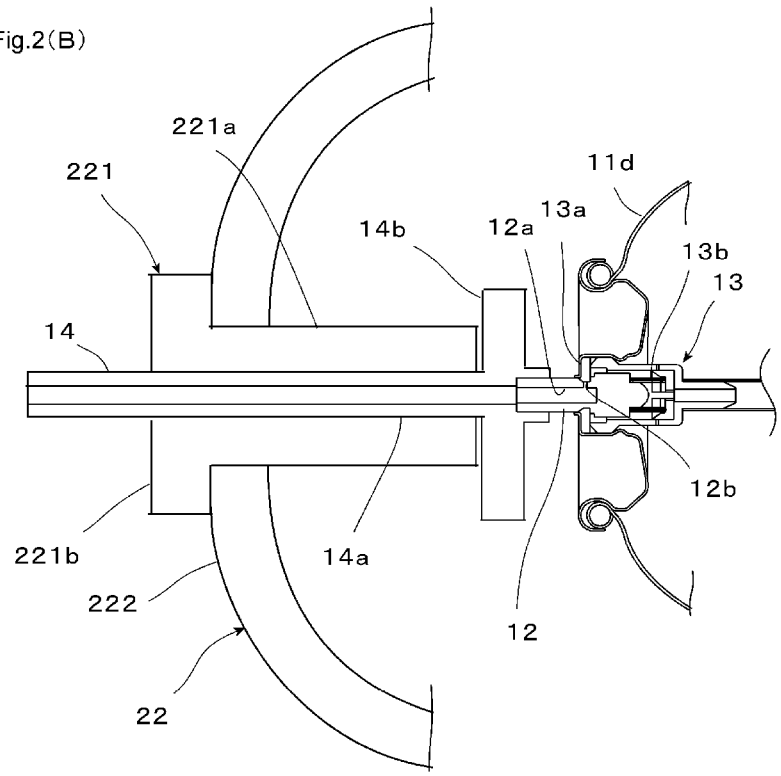
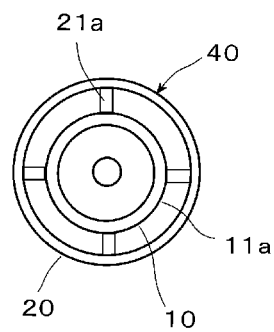
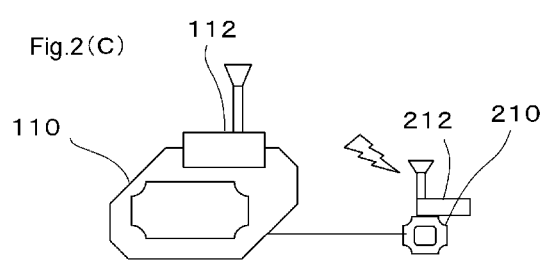
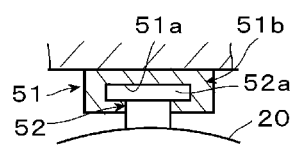

DISCHARGE SYSTEM FOR AIRCRAFT

TECHNICAL FIELD

The present invention relates to a discharge system for an aircraft such as an unmanned aircraft, which discharges contents such as a liquid from the aircraft, and more particularly to a discharge system having an aerosol container that is caused by gas pressure to eject the contents thereof.

BACKGROUND ART

A bee extermination device such as that described in PTL 1, for example, is known in the prior art as a discharge device for an unmanned aircraft that uses this type of aerosol container.

More specifically, a chemical agent supply unit for supplying a chemical agent into a bee's nest is provided in the interior of an airframe, and an aerosol container is attached to the chemical agent supply unit as an injection tool.

CITATION LIST

Patent Literature

Patent Literature 1: Japanese Patent Application Publication No. 2017-104063

SUMMARY OF INVENTION

Technical Problem

In the device of Patent Literature 1, however, the amount remaining in the aerosol container is unknown, making it impossible to manage the exchange timing systematically. With an aerosol container mounted on an unmanned aircraft, discharge must be performed by a remote operation, and in order to exchange the aerosol container, the unmanned aircraft must be returned to a range within which a person can perform work thereon. If the remaining amount is emptied midway, the operation must be interrupted and the unmanned aircraft returned, and as a result, the operation efficiency deteriorates.

The present invention has been designed to solve this problem in the prior art, and an object thereof is to provide a discharge system for an aircraft, in which a remaining amount can be displayed so that an exchange timing can be managed systematically.

Solution to Problem

To achieve the object described above, the present invention is a discharge system for an aircraft, having an aerosol container and a discharge device for discharging contents from the aerosol container, wherein the discharge system discharges the contents of the aerosol container while the aerosol container is attached to the aircraft, the discharge system including remaining amount acquiring means for determining a remaining amount from information relating to the remaining amount of the contents of the aerosol container, and display means for displaying the remaining amount in accordance with remaining amount information acquired by the remaining amount acquiring means.

Thus, the remaining amount in the aerosol container can be checked, and the exchange timing can be managed systematically.

The present invention is configured as follows.

1. The remaining amount acquiring means is configured to include weight measuring means for measuring the weight of the aerosol container and calculate the remaining amount information from the weight measured by the weight measuring means and an initial weight of the aerosol container.

2. The remaining amount acquiring means is configured to include storage means for storing a discharge operation history of the discharge device, acquire a cumulative discharge time of the aerosol container from the discharge operation history of the discharge device, which is stored in the storage means, and estimate the remaining amount information from the cumulative discharge time.

Further, when the discharge time per operation is fixed, the remaining amount acquiring means can estimate the remaining amount information from a cumulative total number of uses of the aerosol container.

3. In a case where the aerosol container uses compressed gas, the remaining amount acquiring means can be configured to include flow velocity measuring means for measuring a flow velocity of the contents of the aerosol container when a valve is open, estimate an internal pressure from the flow velocity measured by the flow velocity measuring means, and estimate the remaining amount from a reduction in the estimated internal pressure.

4. In a case where the aerosol container uses compressed gas, the remaining amount acquiring means can be configured to include internal pressure measuring means for measuring the internal pressure of the aerosol container when a valve is open and estimate the remaining amount from the internal pressure measured by the internal pressure measuring means.

5. The remaining amount display means is configured to display the remaining amount of the contents, acquired by the remaining amount acquiring means, on a display of a steering terminal for steering the aircraft.

Thus, checking can be performed at the same time as steering.

6. The remaining amount display means is configured to display the remaining amount of the contents, acquired by the remaining amount acquiring means, on a display of a terminal for controlling a discharge operation.

Thus, checking can be performed by a terminal operation.

7. The aerosol container is configured to be mounted on the exterior of an airframe of the aircraft.

Thus, an operation to exchange the aerosol container can be performed easily.

8. The aerosol container is configured to be mounted in the interior of an airframe of the aircraft.

Thus, the aerosol container can be protected.

Advantageous Effects of Invention

According to the present invention, as described above, the remaining amount of the aerosol container can be checked, and as a result, the exchange timing can be managed systematically.

BRIEF DESCRIPTION OF DRAWINGS

FIG. 1 is a conceptual view of a discharge device for an aircraft according to a first embodiment of the present invention, wherein FIG. 1(A) is a front view, FIG. 1(B) is a side view, and FIG. 1(C) is a view showing a state in which an aerosol container assembly has been removed.

FIG. 2(A) is a sectional view taken in a right-angled direction to an axis of a support portion of a sleeve shown in FIG. 1, FIG. 2(B) is a view showing an example of a valve configuration of an aerosol container shown in FIG. 1, FIG. 2(C) is a view showing an example in which a power supply of a flight control unit is used as a power supply, and FIG. 2(D) is a view showing an example configuration of coupling portions.

DESCRIPTION OF EMBODIMENTS

Figure 3A:
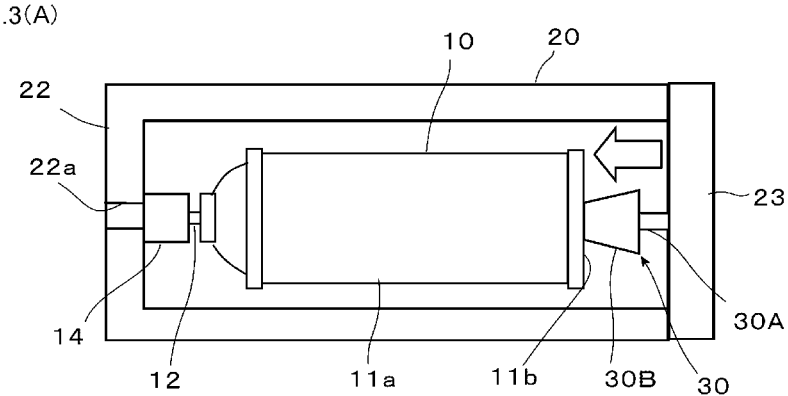
FIGS. 3(A) to 3(C) are views showing three methods employed by a discharge drive unit.

The present invention will be described in detail below on the basis of an embodiment shown in the figures.

The present invention will be described in detail below on the basis of an embodiment shown in the figures.

FIG. 1 is a conceptual view of a discharge device for an aircraft according to an embodiment of the present invention.

In the figure, 1 denotes a discharge device for an aircraft, which includes an aerosol container 10 and discharges contents of the aerosol container 10 when attached to an aircraft 100. As regards the discharged contents, not only a liquid but also a gas, a gas such as air, a powder, or the like may be discharged, and cases in which a sound (a horn) or the like is discharged are also included. Sound discharge is configured so that the sound is emitted when a gas is ejected, for example.

The discharge device 1 for an aircraft is mounted on the exterior of an airframe 101 of the aircraft 100 in a state where the aerosol container 10 is housed in a sleeve 20 serving as a housing member. A discharge drive unit 30 for discharging the contents from the aerosol container 10 is built into the sleeve 20. The sleeve 20 and the aerosol container 10 can be exchanged integrally, and in the following description, an assembly in which the aerosol container 10 is housed in the sleeve 20 will be referred to as an aerosol container assembly 40.

The aircraft 100 is an unmanned aircraft such as a so-called multicopter, the airframe 101 includes a main body portion 102 and a plurality of arm portions 103 extending radially from the main body portion 102, and a rotary blade 104 is provided on the tip end of each arm portion 103 via a motor 105. In the example in the figures, the rotary blades 104 are shown in two locations on the left and right sides, but as long as the rotary blade 104 is provided in a plurality, various well-known multicopters having three rotary blades (a tricopter), four rotary blades (a quadcopter), six rotary blades (a hexacopter), and so on may be applied.

[Aerosol Container]

The aerosol container 10 is a container from which contents are ejected in response to gas pressure from liquefied gas or compressed gas charged in the interior thereof, and an existing metal aerosol can may be applied thereto. A pressure-resistant plastic container may also be used. In the aerosol container 10, various actuators with a flow passage formed therein are attached to a stem 12 in accordance with the discharge direction and discharge form. In the example in the figures, an actuator 14 oriented in a central axis direction is attached to the stem of the aerosol container 10. A nozzle with an orifice formed therein may be attached to the tip end of the actuator 14, and whether to discharge the contents in mist form or in the form of a linear jet is selected as appropriate in accordance with the discharge form and discharge direction of the contents.

The aerosol container 10 is used horizontally, and therefore, as the form in which a propellant and the contents are sealed therein, a segregated form in which an undiluted solution is housed in an inner bag and the propellant is housed between the outer periphery of the inner bag and the inner periphery of the container main body is used. With the segregated form, the contents can be discharged even when the attitude of the aerosol container is in a lateral orientation (the stem is positioned on the side) or a downward orientation (the stem is positioned at the bottom).

The form of the propellant and the contents is not limited to the segregated form. When the aerosol container 10 is used in an attitude where the stem is oriented upward during discharge, a two-phase or three-phase container having a dip tube may be applied, and when the aerosol container 10 is used in an attitude where the stem is oriented downward, a two-phase or three-phase container not having a dip tube may be applied.

Note that as the propellant, a liquefied gas such as a typical hydrocarbon (liquefied petroleum gas) (LPG), dimethyl ether (DME), or a fluorinated hydrocarbon (HFO-1234ze), or a compressed gas such as carbon dioxide (CO2), nitrogen (N2), or nitrous oxide (N2O) may be applied, but in consideration of fire safety, a non-flammable fluorinated hydrocarbon, carbon dioxide, nitrogen, nitrous oxide or the like is preferable, while nitrogen is particularly preferable in consideration of the environmental load.

[Configuration of Sleeve 20]

As regards the material of the sleeve 20, the sleeve 20 is formed from a strong but lightweight material, for example a metal such as aluminum, plastic, or carbon fiber. Further, the material is not limited to a hard material, and a soft material, for example a rubber material such as silicone rubber or urethane rubber, may also be used. In short, any of various materials capable of holding the shape of the housing portion housing the aerosol container 10 can be used. The term "sleeve" is used to mean a tubular member in which the cylindrical aerosol container 10 is housed.

The sleeve 20 is constituted by a cylindrical sleeve main body 21 having a larger diameter than the aerosol container 10, a first end portion cover portion 22 covering one end portion of the sleeve main body 21, and a second end portion cover portion 23 provided on the other end portion.

The first end portion cover portion 22 is screwed to the sleeve main body 21 via a screw portion so as to be detachably fixed thereto, while the second end portion cover portion 23 is fixed to the sleeve main body 21 non-detachably. Alternatively, the second end portion cover portion 23 and the sleeve main body 21 may be formed integrally.

The first end portion cover portion 22 is configured to include a dome-shaped cover main body 222 and a screw tube portion 223 that is screwed to a female screw portion of the sleeve main body 21. In consideration of the aerodynamic characteristic, the cover main body 222 has a conical or dome-shaped curved surface that gradually decreases in diameter toward the tip end and is rounded at the tip end. By forming the cover main body 222 in a shape exhibiting a favorable aerodynamic characteristic in this manner, the effect of horizontal direction wind (crosswinds) can be reduced, and as a result, flight can be stabilized.

A discharge drive unit 30 is housed in the second end portion cover portion 23 positioned on a bottom portion side of the aerosol container 10, and the second end portion cover portion 23 functions as a casing of the discharge drive unit 30. The second end portion cover portion 23 is configured to include a tubular portion 231 fixed at one end to a rear end portion of the sleeve main body 21 (the end portion on the bottom portion side of the aerosol container 10), and an end plate 232 that closes the other end of the tubular portion 231.

[Support Configurations for Aerosol Container 10 Housed in Sleeve 20]

Radial Direction Support

To support the aerosol container 10, the sleeve 20 is provided with a support portion 21a that holds the aerosol container 10 by means of a structure having a distance from the wall surface of the sleeve 20. The support portion 21a is provided in a plurality of locations (three locations in the example in the figures) in an axial direction, and in the example in the figures, the support portions 21a hold a trunk portion 11a of the aerosol container 10 so as to prevent movement thereof in an orthogonal direction to a central axis while allowing movement in the axial direction. As regards the support structure provided by the support portions 21a, the support portions 21a may partially contact the trunk portion 11a of the aerosol container 10 in a plurality of circumferential direction locations, as shown in FIG. 2(A), or the support portions 21a may support the entire circumference by forming an annular wall. As a method for holding the aerosol container 10 in a separated state, instead of supporting the trunk portion 11a in the above manner, the trunk portion 11a may be set in a separated state by supporting the two end portions, for example the shoulder portion and the bottom portion, of the aerosol container 10.

The aerosol container 10 may also be supported in a state where the trunk portion 11a thereof contacts the inner wall of the sleeve 20 rather than being separated therefrom, but by separating the trunk portion 11a of the aerosol container 10 from the inner wall of the sleeve 20, an insulating material or a heat storage material can be interposed in the space formed by the separation.

Note that the sleeve 20 does not have to have a sealed structure and may have a partially ventilated structure. For example, a structure formed by mesh, punching, or the like may be applied. In so doing, effects such as facilitating self-cooling during aerosol discharge by means of outside air and reducing the weight of the sleeve 20 can be achieved.

Axial Direction Support

As regards axial direction support of the aerosol container 10, meanwhile, a bottom portion 11b contacts a movable plate 32b forming a part of the discharge drive unit 30 disposed on the second end portion cover portion 23 side, while a head portion side of the aerosol container 10 is held in the axial direction by bringing a flange portion 14b of the actuator 14 attached to the stem 12 into contact with a pressing member 221 provided on the first end portion cover portion 22.

The pressing member 221 includes a tubular body 221a that projects from an apex portion of the first end portion cover portion 22 toward the stem 12 in the central axis direction of the aerosol container 10, and an end portion flange portion 221b provided on one end of the tubular body 221a and fixed to the first end portion cover portion 22. An axial direction through hole is formed in the tubular body 221a of the pressing member 221. Meanwhile, an actuator main body portion 14a of the actuator 14 penetrates the pressing member 221 slidably, and a tip end surface of the tubular body 221a either contacts or is close to the flange portion 14b, which protrudes from the actuator main body portion 14a. The pressing member 221 may be formed integrally with the second end portion cover portion 23.

[Configuration of Discharge Drive Unit 30]

In the example in the figures, the discharge drive unit 30 housed in the second end portion cover portion 23 is constituted by a cam 32a that is driven to rotate by a motor 31, and the driven-side movable plate 32b, which is moved in a linear direction by the rotation of the cam 32a. The movable plate 32b is provided with a cam follower 32c that contacts the cam 32a, and a rotary motion of the cam 32a is converted into a linear motion of the movable plate 32b via the cam follower 32c. The movable plate 32b is normally in a retraction limit position, whereby a valve 13 is held in a closed position. When the cam 32a is rotated by the motor 31, the movable plate 32b advances. More specifically, a contact region in which the cam follower 32c contacts the cam 32a in the retraction limit position is set so that the distance from the rotary center is short, and a contact region in which the cam follower 32c contacts the cam 32a in an advancement limit position is set so that the distance from the rotary center is long. In the example in the figures, the shape of the cam 32a is exaggerated.

[Configuration of Valve]

FIG. 2(B) shows an example of the valve of the aerosol container 10.

The stem 12 is provided with a discharge flow passage 12a that extends by a predetermined dimension in the axial direction from a tip end opening portion, and a stem hole 12b that serves as a valve hole is opened in a side face of the stem 12. The stem hole 12b is sealed by an inner peripheral surface of a gasket 13a attached to a hole edge of a through hole in a mounting cap 11d.

Normally, the stem 12 is biased in a projecting direction by the gas pressure and the biasing pressure of a spring 13b, and by pushing an inner peripheral edge of the gasket 13a, which serves as a valve body, in the axial direction, the inner peripheral surface of the gasket 13a comes into close contact with a hole edge of the stem hole 12b, which constitutes a valve seat, whereby the valve is maintained in a closed state.

When the movable plate 32b is moved to the advancement limit by the cam mechanism 32 of the discharge drive unit 30 described above, the aerosol container 10 moves to the first end portion cover portion 22 side such that the flange portion 14b of the flanged actuator 14 comes into contact with an end surface of the pressing member 221, and as a result, the stem 12 is pressed relatively toward the inside of the container by a reaction force thereto. When the stem 12 is pressed, an inner peripheral edge of the gasket 13a bends toward the inside of the container such that the inner peripheral surface of the gasket 13a separates from the hole edge of the stem hole 12b, thereby opening the valve, and as a result, the contents pressed by the gas pressure are discharged through the discharge flow passage 12a in the stem 12.

The valve configuration shown in the figures is merely an example, and various configurations that are opened and closed by operating the stem 12 may be applied as the valve configuration.

In this example, the rotary motion of the motor 31 is converted into a linear motion by a cam mechanism, but this motion conversion is not limited to a cam mechanism, and any mechanism for converting the rotary motion of the motor 31 into a linear motion, such as a screw feed mechanism or a rack and pinion, for example, may be applied. Further, as the drive source, a linear motor for performing linear driving, an electromagnetic solenoid, or the like may be used instead of a rotary motor.

[Three Methods Used by Discharge Drive Unit]

Figure 3B:
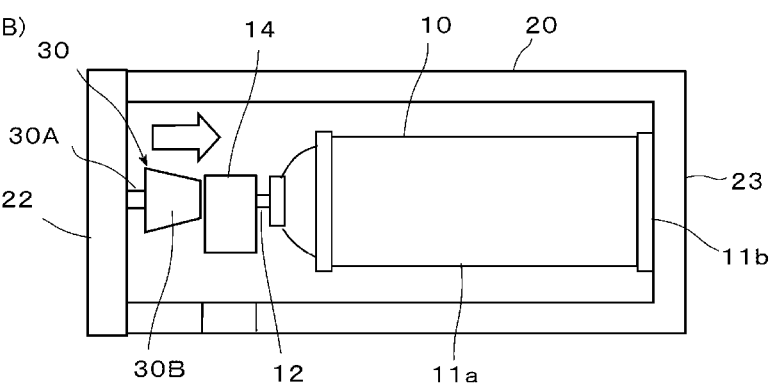
Figure 3C:
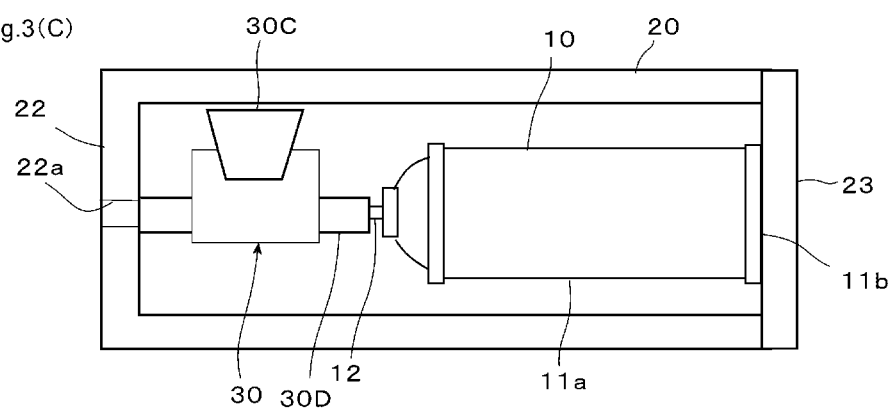

The discharge drive unit 30 shown in FIG. 1 is an example, and any of three methods shown in FIG. 3 can be applied as the configuration of the discharge drive unit 30. In FIG. 3, the sleeve 20 is shown in a simplified square shape.

FIG. 3(A) shows a configuration in which the actuator 15 side of the aerosol container 10 is fixed to the sleeve 20, and a contact member 30B that contacts the bottom portion 11*b* of the aerosol container 10 is pushed up by a drive unit 30A. The discharge drive unit 30 of FIG. 1 is an example of this method. In this method, the actuator 15 side is fixed, and therefore the precision of the discharge position is high. Moreover, this method can be used with aerosol containers 10 of various diameters.

FIG. 3(B) shows a configuration in which the aerosol container 10 is fixed to the sleeve 20 and the actuator 15 is pushed down by the discharge drive unit 30. More specifically, the drive unit 30A of the discharge drive unit 30 drives the contact member 30B contacting the actuator 15 in a direction for pushing the contact member 30B down.

According to this method, the mechanical mechanism can be concentrated on one side of the aerosol container 10, making the aerosol container 10 compact and easy to exchange. Moreover, this method can be used with aerosol containers 10 of various heights.

Note that any mechanism that performs driving in a linear direction may be used as the drive unit 30A in FIGS. 3(A) and 3(B), and accordingly, a motion conversion mechanism such as a cam or a screw feed mechanism that converts the rotary motion of a rotary motor into a linear motion can be used. Moreover, instead of a rotary motor, a linear motor for performing linear driving, an electromagnetic solenoid, or the like may be used.

FIG. 3(C) shows a configuration in which control is performed by an external valve 30C instead of a valve provided in the interior of the aerosol container 10. In the figure, the external valve 30C is illustrated conceptually, but the external valve 30C can be configured so as to be driven to open and close by a solenoid valve or the like. When the external valve 30C is used, the stem 12 of the aerosol container 10 is simply connected to a pipe passage 30D, and therefore the aerosol container 10 can be attached easily and opening/closing control is also easy. When the existing aerosol container 10 is used, the stem 12 is pushed in while incorporating the aerosol container 10, for example, so that the internal valve is held in a normally open state.

[Electrical Equipment]

A discharge control unit 210 serving as a control device for controlling the discharge drive unit 30 is provided separately to a flight control unit 110 for controlling flight of the aircraft 100 and provided on the airframe 101 side together with the flight control unit 110. Further, a discharge power supply 211 for driving the discharge drive unit 30 is provided separately to a power supply for driving the aircraft 100 (this power supply is incorporated into the flight control unit 110 and not shown in the figures) and mounted on the airframe 101 side.

Furthermore, a discharge communication unit 212 including an antenna for remotely operating the discharge drive unit 30 is provided separately to a flight communication unit 112 including an antenna for remotely operating the aircraft 100 and mounted on the airframe 101.

The functions of the discharge control unit 210, the discharge communication unit 212, and the discharge power supply 211 for the discharge drive unit 30 may be executed partially or entirely by the flight control unit 110 and the flight communication unit 121. FIG. 2(C) shows an example in which a shared power supply is disposed in the flight control unit 110.

[Coupling Structure for Coupling to Airframe]

Coupling portions 51, 52 that can be coupled to each other detachably are provided respectively on the airframe 101 of the aircraft 100 and the sleeve 20 of the aerosol container assembly 40. The coupling portions 51, 52 in FIG. 1 are illustrated conceptually, but as shown in FIG. 2(D), for example, by disposing a drive unit slide rail 51*b* having a T-shaped groove 51*a* as the coupling portion 51 on the aircraft 100 side and providing a housing member-side coupling portion 52 having a T-shaped fitting convex portion 52*a* that is fitted to the T-shaped groove 51*a* of the slide rail 51*b* on the outer periphery of the sleeve 20 of the aerosol container assembly 40, the coupling portions 51, 52 can be attached and detached easily. Needless to mention, the coupling portions 51, 52 are not limited to a sliding type fitting structure, and a configuration with which the coupling portions 51, 52 can be attached and detached in a rotation direction, such as a bayonet coupling, as well as various other coupling means facilitating attachment and detachment, such as screwing, a clip joint, or a clamp, may be applied.

Further, as shown in FIG. 1(C), the airframe-side coupling portion 51 and the housing member-side coupling portion 52 are respectively provided with electrical contacts 213*a*, 213*b* for electrically connecting the discharge control unit 210 and discharge power supply 211 disposed on the airframe 101 side to the motor of the discharge drive unit 30 and so on.

The electrical contacts 213*a*, 213*b* do not have to pass through the coupling portions 51, 52 and may be directly connected from the sleeve 20 to a connector disposed in the airframe 101 by a cable or the like, for example. Alternatively, a power supply such as a secondary battery and a wireless communication device may be provided in the sleeve 20, and electrical signals from the flight control unit 110 disposed on the airframe 101 side may be exchanged with the flight control unit 110 in the sleeve 20 by wireless communication.

In the example of FIG. 1, a mounting example in a case where the aerosol container assembly 40 is mounted singly is shown, but a plurality of aerosol container assemblies 40 may be mounted. For example, FIG. 8(A) shows an example in which two aerosol container assemblies 40 are provided on the lower surface of the airframe. In this example, the coupling portions 51, 52 are provided for each of the aerosol container assemblies 40, but shared coupling portions may be provided, and coupling portions 51, 52 of preferred shapes are disposed in accordance with the layout of the aerosol container assemblies 40.

FIG. 8(B) shows an example in which a plurality of aerosol container assemblies 40 are disposed on the upper surface of the airframe 101.

In this case, the operation to exchange the aerosol container assemblies 40 can be performed easily. Further, advantages are gained in that landing of the airframe 101 is not obstructed and the field of view of a camera 106 suspended from the lower surface is also not obstructed.

Figure 8A:
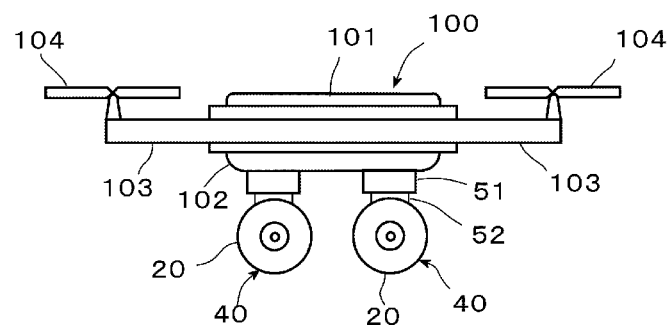
FIGS. 8(A) to 8(C) are views showing example mounting layouts of a housing member.
Figure 8B:
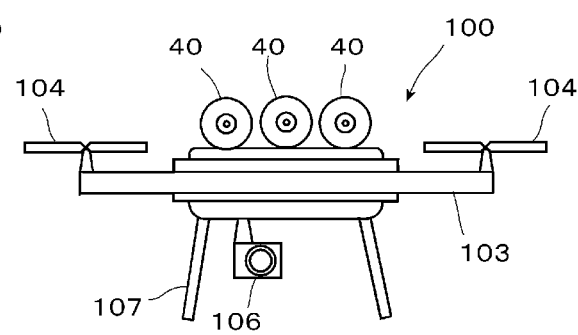
Figure 8C:
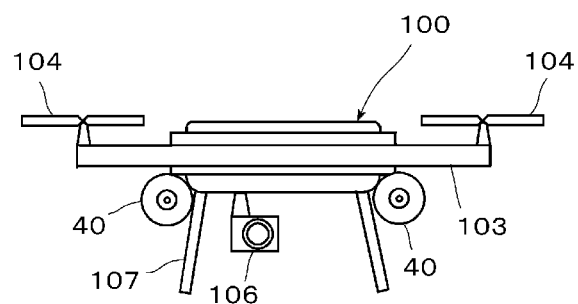

FIG. 8(C) shows an example in which two aerosol container assemblies 40 are attached to side portions of the airframe 101 (the left and right sides in the example in the figure).

In this case, advantages are gained in that landing is not obstructed, exchange can be performed easily, and the airframe 101 can be stabilized and thereby less likely to be affected by crosswinds.

Next, a discharge system using the discharge device for an aircraft according to the present invention will be described.

Figure 4A:
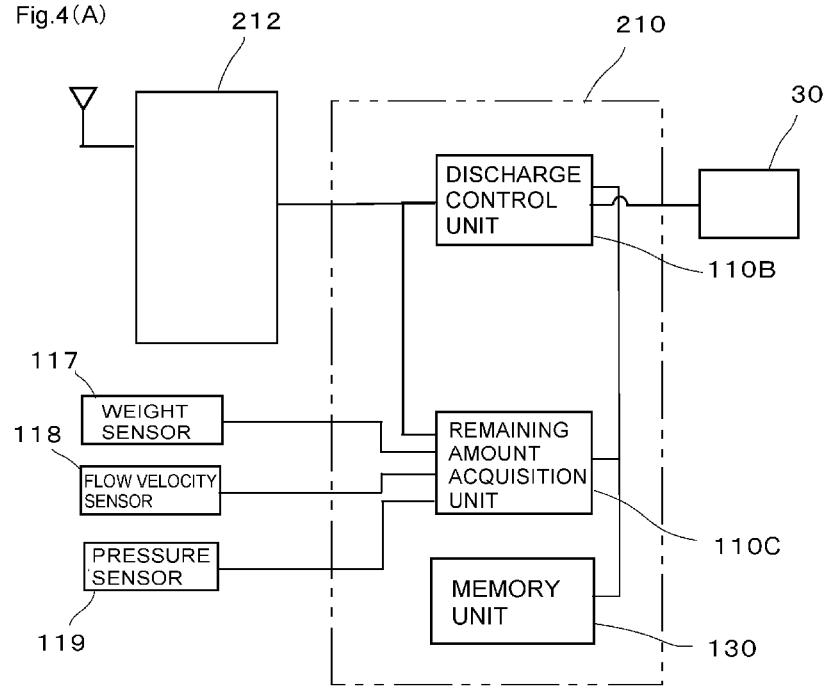
FIG. 4(A) is a functional control block diagram showing a flow of information through a discharge control unit of the discharge system according to the present invention.
Figure 4B:
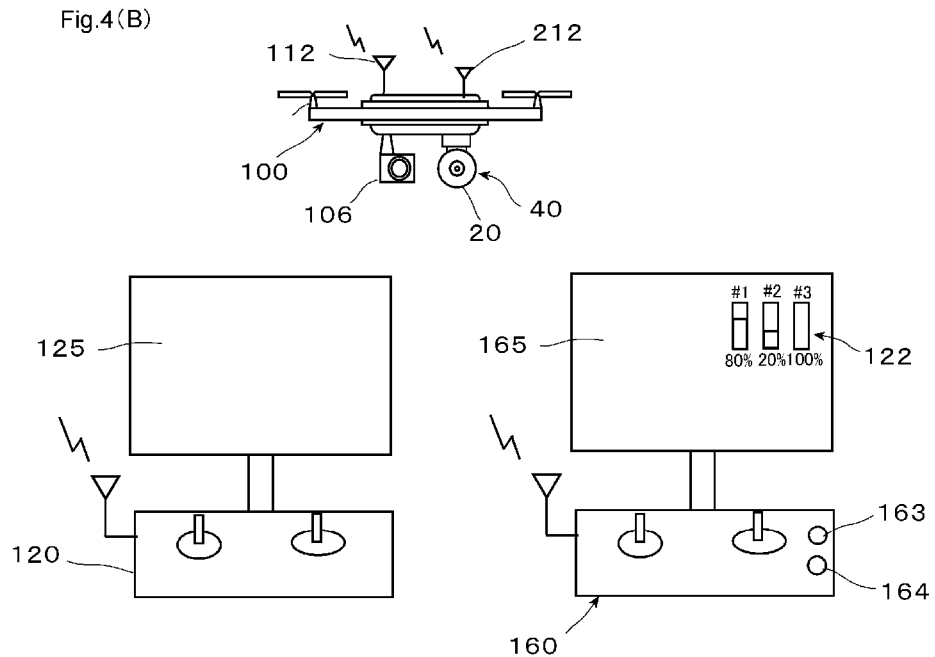
FIG. 4(B) is a schematic view of a steering terminal and a discharge operation terminal.

FIG. 4(A) is a control block diagram of a discharge control unit of the discharge system, and FIG. 4(B) is a view showing a steering terminal and a discharge operation terminal.

In the discharge device for an aircraft described above, the flight control unit 110 and the flight communication unit 112 are independent of the discharge control unit 210 and the discharge communication unit 212. Accordingly, the flight of the aircraft 100 is remotely operated using a steering terminal 120, while the discharge device 1 is remotely operated using a discharge operation terminal 160.

The discharge operation terminal 160 is provided with a discharge button 163 and a stop button 164, and an operator discharges the contents and stops discharge by switching the discharge drive unit 30 ON and OFF using the discharge button 163 and the stop button 164 while viewing an image on a display 165.

As shown in FIG. 4(A), the discharge control unit 210 includes a drive control unit 1108 for controlling the discharge drive unit 30 of the aerosol container 10, a remaining amount information acquisition unit 110C for acquiring remaining amount information in relation to the aerosol container 10, the discharge communication unit 212 for performing transmission and reception to and from the discharge operation terminal 160, and a memory unit 130 serving as storage means.

The drive control unit 1108 and the remaining amount information acquisition unit 110C are described as function blocks for executing respective processes thereof, and accordingly, discharge control and remaining amount acquisition procedures are executed by causing a CPU serving as a hardware resource provided in the discharge control unit 210 to perform calculation processing on the basis of a program stored in the memory unit 130. A nonvolatile memory or the like or any of various storage means such as a ROM or a RAM is used as the memory unit 130.

The drive control unit 1108 outputs a discharge signal to a motor 31 of the discharge drive unit 30 on the basis of a discharge command signal from the discharge operation terminal 160, thereby driving the motor 31 so as to control a discharge operation and a stopping operation of the discharge drive unit 30.

The remaining amount information acquisition unit 110C acquires a remaining amount from information relating to the remaining amount in the aerosol container 10. The information relating to the remaining amount includes the weight of the aerosol container 10, an operation history of the discharge drive unit 30 (the discharge time), the flow velocity of the contents discharged from the aerosol container 10, the internal pressure of the aerosol container 10, and so on.

The remaining amount information calculated by the remaining amount information acquisition unit 110C includes not only a direct remaining amount but also an indirect, estimated remaining amount. The weight is directly related to the remaining amount, and in this case, the remaining amount information acquisition unit 110C calculates the remaining amount directly. The operation history of the discharge drive unit 30, the flow velocity of the contents, and the internal pressure of the aerosol container 10 are information that is indirectly related to the remaining amount, and in this case, the remaining amount information acquisition unit 110C calculates indirect remaining amount information.

Further, the discharge operation terminal 160 is provided with the display 165 for displaying a screen photographed by the camera 106, and a remaining amount display portion 122 for displaying the remaining amount of the aerosol container 10 is provided on a part of the screen of the display 165. In the example in the figure, the remaining amount display portion 122 is in the form of a bar graph on which an image displaying the remaining amount relative to 100% and a percentage display in the form of a numerical value are displayed visibly. Further, the example in the figure shows a case in which three aerosol container assemblies 40 are mounted, and identification information (#1, #2, #3) is attached to either the airframe-side coupling portion 51 by which each aerosol container assembly 40 is mounted or each aerosol container assembly 40 so that the aerosol container 10 can be identified.

Note that in FIG. 4(B), the remaining amount display portion 122 is displayed on the display 165 of the discharge operation terminal 160, but the remaining amount display portion 122 may be provided on both the discharge operation terminal 160 and a display 125 of the steering terminal 120.

Figure 7:
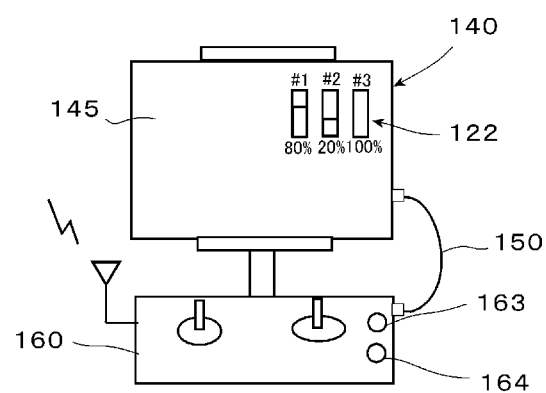
FIG. 7 is a view showing a different example configuration of the discharge operation terminal shown in FIG. 4(B).

Further, FIG. 4(B) shows an example in which the display 1625 is fixed to the discharge operation terminal 160, but as shown in FIG. 7, a portable terminal 140 such as a tablet type personal computer or a smartphone (a multifunctional portable telephone) may be connected to the discharge operation terminal 160 via a communication interface 150, and in conjunction with a communication function of the discharge operation terminal 160, the remaining amount display portion 122 may be displayed on a display 145 of the portable terminal 140 together with a photographed screen.

Furthermore, in the above description, the discharge control unit 210 is provided separately from the flight control unit 110 of the aircraft, but the functions of the discharge control unit 210 may be executed by the flight control unit 110. In this case, information is exchanged between the steering terminal 120 and the flight communication unit 112 by wireless communication such that the remaining amount display portion is displayed either on the display of the steering terminal 120 or a display of a portable terminal connected to the steering terminal 120 via a communication interface.

Next, remaining amount calculation methods for the aforesaid four types of information relating to the remaining amount will be described briefly.

1. When Weight is Used as the Information Relating to the Remaining Amount

Figure 5A:
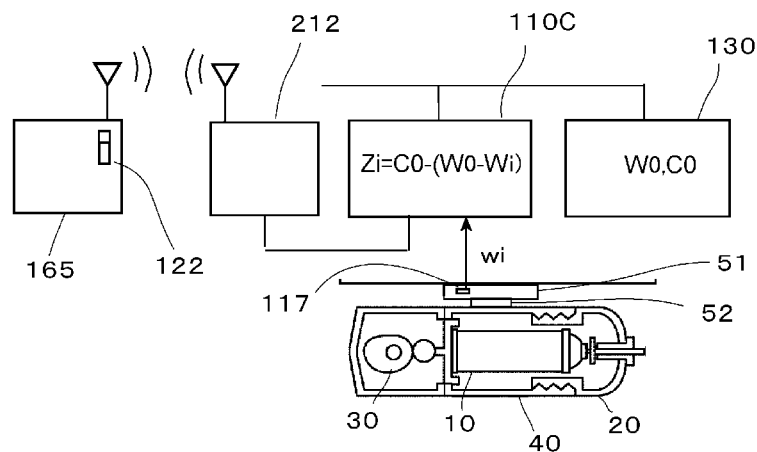
FIG. 5(A) is an illustrative view of a case in which remaining amount information is acquired using a weight sensor.

As shown in FIG. 5(A), the remaining amount information acquisition unit 110C is configured to include a weight sensor 117 serving as weight measuring means for measuring the weight of the aerosol container assembly 40 housing the aerosol container 10, and a remaining amount $Z_i$ is calculated from a weight $W_i$ measured by the weight sensor 117 as well as an initial weight $W_0$ of the aerosol container assembly 40 and a weight C0 of the contents of the aerosol container 10 in an initial state, which are stored in the memory unit 130.

For example, the remaining amount in the aerosol container 10 housed in the aerosol container assembly 40 can be detected by providing the weight sensor 117 on the airframe-side coupling portion 51 to which the aerosol container assembly 40 is coupled. The weight of the aerosol container 10 and the weights of the sleeve 20 and the discharge drive unit 30 are added to the weight of the aerosol container assembly 40, and since the initial weight W0 of the aerosol container assembly 40 is measured in advance and stored in the memory unit 130 and a value subtracted from the initial weight W0 corresponds to the reduction in the contents, an amount acquired by subtracting the reduction from the initial weight C0 of the contents can be calculated as the remaining amount Zi.

By ascertaining the remaining amount prior to flight, the exchange timing can be predicted, and as a result, systematic management becomes possible.

Further, gravitational direction acceleration is constantly detected by an acceleration sensor of the flight control unit 110, and therefore, by removing the effect of the acceleration detected by the acceleration sensor from the value measured by the weight sensor 117 in a state of flight, the remaining amount of the contents can be monitored at all times.

Any sensor that converts a load into an electrical signal can be used as the weight sensor 117, and various sensors, such as a sensor using a piezoelectric element, a sensor using a magnetostrictive element, an electrostatic capacitance type sensor, or a sensor using a strain gauge, can be used.

2. Estimation of Remaining Amount from Operation History of Discharge Drive Unit 30

Figure 5B:
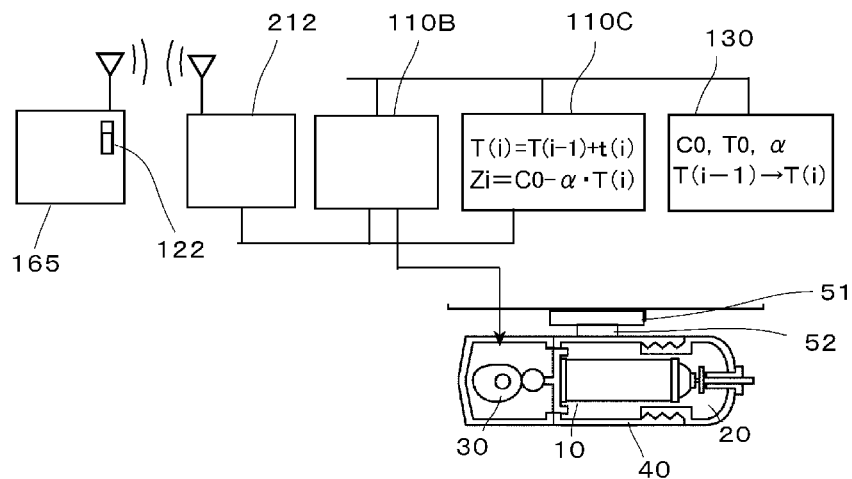
FIG. 5(B) is an illustrative view of a case in which the remaining amount information is acquired from a discharge time.

As shown in FIG. 5(B), the remaining amount information acquisition unit 110C acquires a cumulative discharge time of the aerosol container 10 from the discharge operation history of the discharge drive unit 30, estimates the remaining amount from the cumulative discharge time, and sets the estimated remaining amount as the remaining amount information.

For example, the remaining amount information acquisition unit 110C activates a timer using the discharge command signal as a trigger, stops the timer in response to the stop command signal, determines a discharge time t(i), adds the determined discharge time t(i) to a cumulative discharge time T(i−1) up to the previous operation, and sets the result as an updated cumulative discharge time T(i). By multiplying a discharge amount α per unit time by the cumulative discharge time T(i), a cumulative discharge amount is calculated, and by subtracting the cumulative discharge amount from the weight C0 of the contents of the aerosol container 10 in the initial state, the remaining amount Zi can be calculated.

When a percentage display is employed, there is no need to calculate the discharge amount itself, and instead, a discharge time from the initial state to an empty state is stored in the memory unit 130 as a lifespan T0, and by displaying a remaining lifespan, which is acquired by subtracting the cumulative discharge time from the lifespan, as a percentage of the lifespan, a percentage display of the remaining amount is realized.

Furthermore, when the discharge time per operation is fixed, the remaining amount information acquisition unit 110C can also estimate the remaining amount from the number of discharge operations of the discharge drive unit 30. More specifically, by storing the initial weight and the discharge amount per operation in advance in the memory unit 130 and subtracting the discharge amount per operation from the initial weight every time a discharge operation is performed, the remaining amount can be calculated. Moreover, the number of times discharge can be performed before reaching the empty state may be determined in advance, and the remaining number of times discharge can be performed, which is acquired by subtracting a cumulative number of uses from the number of times discharge can be performed, may be estimated as the remaining amount information and displayed as a percentage.

Figure 6A:
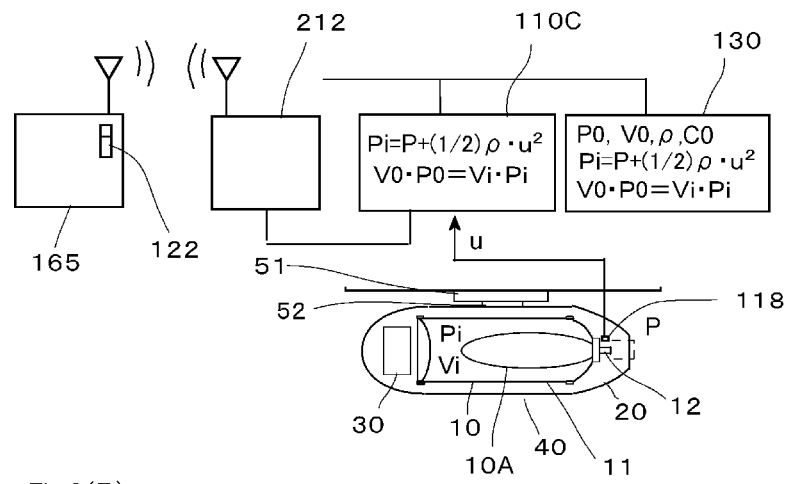
FIG. 6(A) is an illustrative view of a case in which the remaining amount information is acquired using a flow velocity sensor.

3. Estimation of Remaining Amount from Flow Velocity of Contents During Discharge FIG. 6(A) is an illustrative view of a case in which the remaining amount is determined from the discharge flow velocity of the contents.

As shown in the figure, this method is limited to a case in which the aerosol container 10 uses compressed gas. For example, the contents are charged into an inner bag 10A, and compressed gas is charged into a space between the inner bag 10A and the container main body 11. An initial internal pressure and an initial volume of the compressed gas are set as P0 and V0, respectively, and as the contents are discharged, the volume increases and the internal pressure decreases in accordance with the amount by which the inner bag contracts.

The remaining amount information acquisition unit 110C is configured to include a flow velocity sensor 118 serving as flow velocity measuring means for measuring the flow velocity of the contents of the aerosol container 10 during discharge. An internal pressure Pi is estimated from a flow velocity u measured by the flow velocity sensor 118, and the remaining amount is estimated from the estimated internal pressure Pi.

The internal pressure is ascertained from the flow velocity u of the contents during discharge using the following formula (Bernoulli's Law). In the following formula, P denotes atmospheric pressure, and ρ denotes the specific gravity of the contents.

$$Pi = P + (1/2)\rho \times u^2 \quad (1)$$

When the discharged contents are a conductive liquid such as an aqueous solution, an electromagnetic flow velocity meter can be used as the flow velocity sensor 118. For example, the sensor is disposed so that a magnetic field that is perpendicular to the flow passes through the stem 12 in which the discharge flow passage is formed, and the flow velocity can be determined from a voltage generated when the liquid flows through the magnetic field. The flow velocity sensor 118 is not limited to an electromagnetic flow velocity meter, and various flow velocity meters, such as an ultrasonic flow velocity meter, can be used. Note that the atmospheric pressure P may be measured by providing the aircraft with a barometer.

Further, when the temperature is constant, a fixed relationship exists between the internal pressure and the volume (Charles's Law), and therefore, by ascertaining the relationship between the internal pressure P0 and the volume V0 in the initial state, the volume Vi of the compressed gas can be calculated from the internal pressure Pi, which is acquired from the relationship of the above formula, using the following formula.

$$V0 \times P0 = Vi \times Pi \quad (2)$$

An increase in volume (Vi−V0) corresponds to a reduction in the contents, and therefore an amount acquired by subtracting the reduction $\rho(Vi-V0)$ from the initial weight $C0$ of the contents can be calculated as the remaining amount $Zi$.

$$Zi = C0 - \rho(Vi - V0) \qquad (3)$$

By storing the weight $C0$ of the contents of the aerosol container 10 in the initial state, the volume $V0$ and internal pressure $P0$ in the initial state, and the calculation formulae described above in advance in the memory unit 130, the estimated remaining amount of the contents can be calculated by the remaining amount information acquisition unit 110C.

Further, in the case of a percentage display, as long as the initial volume $Vc0$ of the contents is stored in advance, since $(Vi-V0)$ denotes the reduction, a ratio of the result of subtracting the reduction $(Vi-V0)$ from the initial volume $Vc0$ may be displayed as the remaining amount information in the form of a percentage. Note that in the above example, the temperature is assumed to be constant, but instead, the aircraft may be provided with a thermometer and corrections may be performed in response to temperature variation.

Note that the remaining amount does not have to be calculated using mathematical formulae, and instead, a relationship between the discharge flow velocity and the remaining amount may be stored in a database in advance, and a remaining amount corresponding to the discharge flow velocity may be acquired.

Figure 6B:
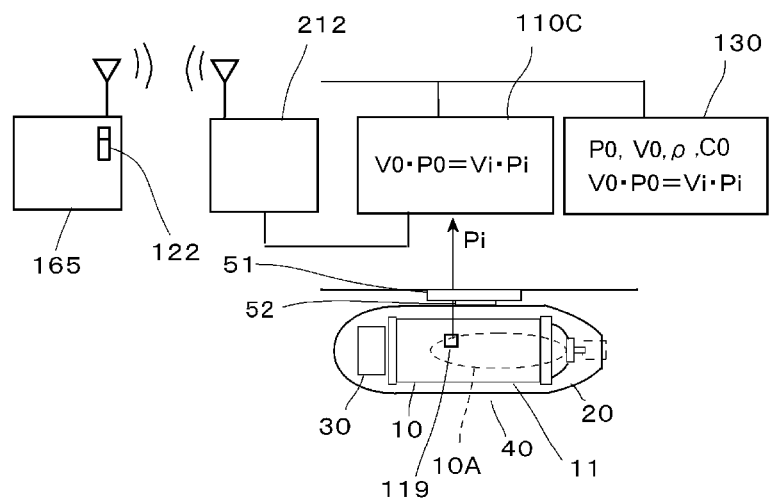
FIG. 6(B) is an illustrative view of a case in which the remaining amount information is acquired using a pressure sensor.

4. Detection of Container Internal Pressure and Estimation of Remaining Amount from Variation in Internal Pressure FIG. 6(B) is an illustrative view of a case in which the container internal pressure is detected and the remaining amount is estimated from variation in the internal pressure.

This method is also limited to a case in which the aerosol container 10 uses compressed gas.

The remaining amount information acquisition unit 110C is provided with a pressure sensor 119 serving as pressure measuring means for measuring the internal pressure $Pi$ of the aerosol container 10, and the remaining amount is estimated from the internal pressure $Pi$ measured by the pressure sensor 119.

As noted above, the internal pressure $Pi$ decreases as the volume of the compressed gas increases in accordance with the reduction in the volume of the contents accompanying discharge of the contents, and therefore, using formula (2) and formula (3) illustrated above, the volume reduction in the contents can be calculated from the reduction in the internal pressure $Pi$, and the remaining amount can be calculated from the volume reduction. The aircraft may be provided with a thermometer, and corrections may be performed in response to temperature variation.

As the pressure sensor 119 for measuring the internal pressure, a strain gauge, for example, can be adhered to the surface of the aerosol container 10, and the strain on the container, which corresponds to the internal pressure, can be converted into the internal pressure. For example, by storing a relationship between the internal pressure and the strain on the container in advance as information, the internal pressure can be determined from the output of the strain gauge.

Next, a discharge operation and an exchange operation using the discharge system for an aircraft according to the present invention will be described.

[Exchange Operation]

The aerosol container assembly 40, in which the aerosol container 10 is housed in the sleeve 20, is prepared in advance. In an exchange operation, the coupling portions 51, 52 are detached and the new aerosol container assembly 40 is attached. By forming the coupling portions 51, 52 to be easily attachable and detachable by means of a manual operation without the use of a tool, for example, exchange can be performed easily. Following the exchange, the aerosol container 10 is removed from the sleeve 20 of the aerosol container assembly 40, and after completely discharging the gas and contents therein, the aerosol container 10 is discarded. The sleeve 20 can be used repeatedly. Further, by universalizing the coupling portions 51, 52 that are coupled to the aircraft 100, aerosol container assemblies 40 of different sizes can be used, while the airframe 101 side of the aircraft 100 need only be subjected to minimal modification in order to provide the coupling portion 5150.

Furthermore, in this embodiment, it is possible to exchange only the aerosol container 10 while keeping the sleeve 20 fixed to the aircraft 100.

[Spraying Operation]

When power is supplied to the steering terminal 120, the discharge operation terminal 160, and the aircraft 100, a remaining amount acquisition process is executed by the remaining amount information acquisition unit 110C using the various methods described above, whereby the remaining amount of the contents of the aerosol container 10 in the mounted aerosol container assembly 40 is acquired, and the remaining amount is displayed in the remaining amount display portion 122 of the display 125 of the steering terminal 120.

By checking the remaining amount, the user can determine whether or not the amount is sufficient for discharging the contents onto a planned discharge area, and when the amount is insufficient, the user can exchange the aerosol container assembly 40 for a new aerosol container assembly 40. Further, since the remaining amount is ascertained in advance, the operation can be performed systematically by, for example, preparing a new aerosol container assembly 40, and when the contents have been used up, returning the aircraft 100 and exchanging the aerosol container assembly 40 for the new aerosol container assembly 40.

After the remaining amount has been checked, the flight of the aircraft 100 is remotely operated using the steering terminal 120, while the discharge device 1 is remotely operated using the discharge operation terminal 160. The discharge operation terminal 160 is provided with the discharge button 163 and the stop button 164, and when the operator presses the discharge button 163 while viewing the image on the display 165, the discharge command signal is transmitted and received in the discharge communication unit 212 installed in the aircraft 100. The discharge drive unit 30 is then driven by the discharge control unit 210, whereby the stem 12 of the aerosol container 10 is pressed in, and as a result, the contents are discharged. When the stop button 164 is pressed, the stop command signal is transmitted, causing the discharge drive unit 30 to release the pressing applied to the stem 12, and as a result, the discharge is stopped. Meanwhile, the display 125 displays images from the camera, while the remaining amount display portion 122 displays the remaining amount, and therefore the discharge operation is performed while checking the remaining amount and the state of the discharge operation.

Switching between discharge and stopping can be performed not only by operating the buttons but also automatically in accordance with a program stored in advance. For example, a route can be pre-programmed, the position on a map and the height can be detected using a signal from a GPS and an altimeter, respectively, discharge can be started when a predetermined position is reached, and discharge can be stopped when discharge over a predetermined area is complete. Likewise in this case, the remaining amount display portion 122 of the display 125 displays the remaining amount, and therefore, when the remaining amount is insufficient, the aircraft 100 can be returned in order to exchange the aerosol container assembly 40.

Note that in a case where a plurality of aerosol container assemblies 40 are carried, when the remaining amount of one of the aerosol container assemblies 40 reaches zero, it is possible to switch to an auxiliary aerosol container assembly and continue discharge. In the case of automatic discharge, it is possible to apply a setting so that aerosol container assembly switching is also performed automatically.

Note that in the configuration described in the above embodiment, the aerosol container 10 is mounted on the aircraft 100 in the form of an aerosol container assembly in which the aerosol container 10 is housed in the sleeve 20, but the present invention can also be applied to a discharge device that performs discharge in a state where the aerosol container 10 is mounted on the exterior of the airframe of the aircraft as is, without being housed in a sleeve, or to a similar discharge device to a conventional device, in which the aerosol container 10 is mounted in the interior of the airframe.

Further, in the above embodiment, an example in which a multicopter is used as the unmanned aircraft was described, but the aircraft may also be a fixed-wing aircraft, a rotorcraft, an air balloon, a glider, or the like.

REFERENCE SIGNS LIST

1 Discharge device
10 Aerosol container
10A Inner bag
11 Container main body
11a Trunk portion
11b Bottom portion
11d Mounting cap
12 Stem
12a Discharge flow passage
12b Stem hole
13 Valve
13a Gasket
13b Spring
14 Flanged actuator
14a Actuator main body portion
14b Flange portion
15 Nozzle
20 Sleeve
21 Sleeve main body
21a Support portion
22 First end portion cover portion
221 Pressing member
221a Tubular body
221b End portion flange portion
222 Cover main body
223 Screw tube portion
30 Second end portion cover portion
231 Tubular portion
232 End plate
30 Discharge drive unit
31 Motor
32a Cam
32b Movable plate
32c Cam follower
30A Drive unit
40 Aerosol container assembly
51 Airframe-side coupling portion
51a T-shaped groove
51b Slide rail
52 Housing member-side coupling portion
52a Fitting convex portion
100 Aircraft
101 Airframe
102 Main body portion
103 Arm portion
104 Rotary blade
105 Motor
106 Camera
107 Leg portion
110 Flight control unit
210 Discharge control unit
110B Drive control unit
110C Remaining amount information acquisition unit
212 Discharge communication unit
213 Electrical contact
213a Airframe-side electrical contact
213b Housing member-side electrical contact
117 Weight sensor
118 Flow velocity sensor
119 Pressure sensor
120 Steering terminal
125 Display
160 Discharge operation terminal
163 Discharge button
164 Stop button
165 Display (display means)
122 Remaining amount display portion
130 Memory unit
C0 Initial weight of contents
P0 Initial internal pressure of aerosol container
Pi (Measured) internal pressure of aerosol container
P Atmospheric pressure
T(i) Cumulative discharge time
T0 Lifespan
t(i) Discharge time
T(i−1) Cumulative discharge time up to previous operation
V0 Initial volume of compressed gas storage space in aerosol container
Vi (Measured) volume of compressed gas storage space in aerosol container
W0 Initial weight of aerosol container assembly
Zi Remaining amount
u Flow velocity
α Discharge amount per unit time
ρ Specific gravity of contents

The invention claimed is:

1. A discharge system for an aircraft, having an aerosol container and a discharge device for discharging contents from the aerosol container, wherein the discharge system discharges the contents of the aerosol container while the aerosol container is attached to the aircraft, the discharge system comprising a remaining amount acquiring unit for determining a remaining amount of the contents of the aerosol container from information relating to the remaining amount of the contents of the aerosol container, a display unit for displaying the remaining amount of the contents of the aerosol container in accordance with the remaining amount information acquired by the remaining amount acquiring unit, a discharge drive unit for discharging the contents from the aerosol container, a drive control unit for controlling the discharge drive unit by sending a discharge command signal and a stop command signal to the discharge drive unit, and a timer, for measuring a discharge time of the aerosol container, wherein the timer is activated by the discharge command signal and stopped by the stop command signal, wherein the remaining amount acquiring unit identifies the mounted aerosol container by identification information, stores in advance the discharge time from an initial state to an empty state as a lifespan in a storage unit, obtains a cumulative discharge time by adding the discharge time from the discharge command signal to the stop command signal, and estimates the remaining amount information of the aerosol container from the lifespan and the accumulated discharge time.

2. The discharge system for an aircraft according to claim 1, wherein the remaining amount acquiring unit includes a weight measuring unit for measuring a weight of the aerosol container and calculates the remaining amount information from the weight measured by the weight measuring unit and an initial weight of the aerosol container.

3. The discharge system for an aircraft according to claim 1, wherein the remaining amount acquiring unit includes the storage unit for storing an operation history of the discharge device, acquires the cumulative discharge time of the aerosol container, which is stored in the storage unit, and estimates the remaining amount information from the cumulative discharge time.

4. The discharge system for an aircraft according to claim 1, wherein the aerosol container uses compressed gas, and
the remaining amount acquiring unit includes a flow velocity measuring unit for measuring a flow velocity of the contents of the aerosol container when a valve is open, estimates an internal pressure from the flow velocity measured by the flow velocity measuring unit, and estimates the remaining amount from a reduction in the estimated internal pressure.

5. The discharge system for an aircraft according to claim 1, wherein the aerosol container uses compressed gas, and the remaining amount acquiring unit includes an internal pressure measuring unit for measuring the internal pressure of the aerosol container when a valve is open and estimates the remaining amount from the internal pressure measured by the internal pressure measuring unit.

6. The discharge system for an aircraft according to claim 1, wherein the display unit is configured to display the remaining amount of the contents, acquired by the remaining amount acquiring unit, on a display of a steering terminal for steering the aircraft.

7. The discharge system for an aircraft according to claim 6, wherein the aerosol container is mounted on an exterior of an airframe of the aircraft.

8. The discharge system for an aircraft according to claim 6, wherein the aerosol container is mounted in an interior of an airframe of the aircraft.

9. The discharge system for an aircraft according to claim 1, wherein the display unit is configured to display the remaining amount of the contents, acquired by the remaining amount acquiring unit, on a display of a terminal for controlling a discharge operation.

10. The discharge system for an aircraft according to claim 9, wherein the aerosol container is mounted on an exterior of an airframe of the aircraft.

11. The discharge system for an aircraft according to claim 9, wherein the aerosol container is mounted in an interior of an airframe of the aircraft.

12. The discharge system for an aircraft according to claim 1, wherein the aerosol container is mounted on an exterior of an airframe of the aircraft.

13. The discharge system for an aircraft according to claim 1, wherein the aerosol container is mounted in an interior of an airframe of the aircraft.

* * * * *